United States Patent [19]
Ponsard

[11] Patent Number: 5,050,193
[45] Date of Patent: Sep. 17, 1991

[54] DEVICE FOR SYNCHRONIZING A CLOCK IN RELATION TO AN INCIDENT DIGITAL SIGNAL, IN PARTICULAR AT HIGH TRANSMISSION RATES

[75] Inventor: Benoit Ponsard, Boulogne Billancourt, France

[73] Assignee: Electronique Serge Dassault, Saint-Cloud, France

[21] Appl. No.: 274,478

[22] Filed: Nov. 21, 1988

[30] Foreign Application Priority Data

Nov. 25, 1987 [FR] France ................... 8716357

[51] Int. Cl.⁵ ........................ H04L 02/02
[52] U.S. Cl. ..................... 375/108; 331/1 A; 375/120
[58] Field of Search ........... 375/108, 119, 120; 331/47-49, 1 A, 2, 1 R; 328/133, 139

[56] References Cited
U.S. PATENT DOCUMENTS

| | | | |
|---|---|---|---|
| 3,979,691 | 9/1976 | Balliet | 331/1 A |
| 4,301,537 | 11/1981 | Roos | 375/108 |
| 4,484,152 | 11/1984 | Lee | 331/1 A |
| 4,672,447 | 6/1987 | Möring et al. | 331/1 A |
| 4,704,721 | 11/1987 | Barr | 375/118 |

FOREIGN PATENT DOCUMENTS 0168330 7/1985 European Pat. Off. .
2143096A 1/1985 United Kingdom .

OTHER PUBLICATIONS

A Self Correcting Clock Recovery Circuit, Charles R. Hogge, Jr., 8093 IEEE Transactions on Electron Devices ED-32 (1985), Dec., No. 12, New York, USA, 2704/5/6.

Primary Examiner—Benedict V. Safourek
Assistant Examiner—Tesfaldet Bocure
Attorney, Agent, or Firm—Christie, Parker & Hale

[57] ABSTRACT

The device comprises preprocessing circuitry which deliver to a phase locked loop a preprocessed signal obtained from a replica of the incident digital signal staggered in time by a fraction of the cycle of the clock signal of the phase locked loop. This device then allows a fast synchronization of the clock of the phase locked loop in relation to the incident digital signal, in particular at high transmission rates.

21 Claims, 10 Drawing Sheets

DEVICE FOR SYNCHRONIZING A CLOCK IN RELATION TO AN INCIDENT DIGITAL SIGNAL, IN PARTICULAR AT HIGH TRANSMISSION RATES

FIELD OF THE INVENTION

The invention concerns a device for processing an incident digital signal to establish a state of synchronisation between a clock signal and the incident digital signal. It applies to the transmissions in the base band and is particularly suitable for a high transmission rate, exceeding 1 megabit per second, although it could also be used for lower transmission rates.

PRIOR ART

The transmission of a binary message in the base band is effected by means of a clock transmission signal. A transition frequency defined by this clock is created, which depends on the binary content of the message and the line code used. For example, the two phase code is based on transmitting, for a "1" bit, a high state, followed by a low state at the interval of the clock pulses; of course, the opposite is effected for an "0" bit. The expert knows that there follow therefrom absences in transition in the transmitted signal when the bit of the message changes. More generally, the invention applies to any digital message coded by a sucession of high and/or low states.

To process the digital messages transmitted, it is necessary to have their clock signal available at reception. Most frequently, a clock reconstitution stage is used for this purpose arranged in a phase locked loop.

This loop comprises in the conventional manner, an oscillator generating the clock signal herein termed the main signal, and means for synchronising this clock with the incident digital signal throughout the whole transmission. After synchronisation, the loop also provides the sucessive states of the incident signal from which the message can be extracted. To facilitate obtaining the synchronisation, the start of the digital transmission comprises in principle a succession of alternating high and low states, usually termed the preamble.

However, the duration of this initial synchronisation depends on the time difference between the main clock signal and the digital signal. If this difference is close to zero, the synchronisation of the clock is quickly obtained. If this difference is in absolute terms close to a half-cycle of the clock, the phase locked loop is situated in an unstable zone. Obtaining the synchronisation then takes rather long. The length of the preamble must therefore be extended. This is obviously a handicap for high transmission rates. This extended anti-synchronisation phenomenon is known as "hang-up".

One method for overcoming this "hang-up" phenomenon lies in direct action on the phase locked loop. This action may lie in a rapid modification of the characteristics for example, by suddenly reversing the high and low values of successive states of the main clock signal (the clock phase is then reversed). This kind of operation, acceptable for transmission rates not exceeding one megabit per second, is not suitable for much higher rates of the order of 32 megabits per second for example: there then occur, in particular, problems of recognising the succession of the high and/or low states of the signal after the sudden reversal of the clock phase.

After synchronisation, there exists another problem at the reception of digital messages at the level of the conventional phase detectors of the phase locked loop. In point of fact, the coding of the message by a succession of high and/or low states causes, in the nature of things, the disappearance of transitions in the incident digital signal. In these conditions, the conventional phase locked loops function rather badly because they frequently interpret such an absence of transition as a very considerable difference between the clock signal and the digital signal. This is reflected in a sudden change in the control voltage of the oscillator of the phase locked loop and destabilises the latter.

OBJECTS OF THE INVENTION

It is an object of the present invention to overcome these drawbacks by subjecting the digital signal to pre-processing before entry into the clock reconstitution stage in order to provide for the latter a preprocessed digital signal capable of a rapid synchronisation of the main clock signal.

It is another object of the invention, in the case where a phase locked loop is used, to deliver to the oscillator generating the main clock signal a substantially zero control signal in the absence of transition of the preprocessed signal so as notto destabilise the loop.

SUMMARY OF THE INVENTION

The invention therefore provides a device for processing an incident digital signal, carrying in the base band messages coded by a succession of high and/or low states on a transmission clock, comprising:
an input for the reception of the incident digital signal;
a clock reconstitution stage comprising a main adjustable clock of a rated frequency linked to that of the transmission clock and an input for the synchronisation of this main clock capable of being connected to the reception input; and processing means comprising:
  (i) a three state switch in each one of which it respectively connects its first, second and third input to the said synchronisation input;
  (ii) delay means interposed between the receiving input and the switch and capable of respectively providing to the second and third inputs of the switch, at least a first pair of differing replicas of the incident signal, the two replicas being staggered in time in relation to one another by a fraction of the cycle of the main clock, preferably substantially a half-cycle;
  (iii) an auxiliary clock operating at a predetermined frequency chosen to allow it to be applied to the first input of the switch with a view to synchronising the main clock, and
  (iv) control means sensing the presence of the incident digital signal in order:
    (a) to put the switch in the absence of the incident signal into its first state, the main clock then being synchronised with the auxiliary clock, and
    (b) to put the switch in the presence of the incident into its second or third state, depending on the timing situation of the auxiliary clock relative to the incident signal.

More specifically, the clock reconstitution stage includes a main adjustable clock for providing a main clock signal having a rated frequency which is K times the frequency of the transmission clock, where K is an integer at least equal to one, and further includes synchronisation means for synchronisation of the main adjustable clock in response to a synchronization signal.

Delay circuits responsive to the incident digital signal provide first and second replicas of the incident signal whereby the second replica is delayed in time from the first replica by a fraction of one cycle of the main adjustable clock rated frequency. The auxiliary clock provides an auxiliary clock signal operating at a frequency harmonically related to the rated frequency of the main adjustable clock.

Detection circuits determine the presence or absence of the incident digital signal, and the control means is responsive to the detection and delay circuits for performing the following control functions:

providing, in the absence of the incident digital signal, the auxiliary clock signal as the synchronization signal to the synchronisation means so that the main adjustable clock is synchronized to the auxiliary clock signal; and providing, in the presence of the incident digital signal, the first replica or the second replica of the incident signal as the synchronization signal to the synchronisation means, depending on the timing relationship between the auxiliary clock signal and the incident digital signal.

In a preferred embodiment, the incident digital signal can start with a succession of alternating high and low states.

According to a variant of the invention, in the presence of the incident signal, the control means place the switch into its second or third state depending on the timing situation of the auxiliary clock relative to the said first pair of replicas.

In a preferred embodiment, the delay means are capable of providing a second pair of replicas of the incident signal which are different from the replicas of the first pair and also staggered in relation to each other by the said fraction of the cycle of the main clock, one of the replicas of this second pair being staggered, with respect to time, in relation to each of the two replicas of the first pair by substantially half of the said fraction of the cycle of the main clock.

In the presence of an incident signal, the control means advantageously place the switch into its second or its third state depening on the timing situation of the auxiliary clock relative to this second pair of replicas of the incident signal.

The control means advantageously comprises, on the one hand, sampling means, for simultaneously and separately sampling at the frequency of the auxiliary clock, each one of the replicas of the pair, in respect of which the timing situation of the auxiliary clock is determined and, on the other hand, means for comparing these sampled replicas providing a comparison signal representing the respective value of these replicas.

The control means preferably comprise, moreover, a control logic actuated at the frequency of the auxiliary clock and means for memorising the respective value of the two replicas of the pair, in respect of which the timimg situation of the auxiliary clock is determined, the output of these memory means and one output of the control logic forming part of a control signal for the switch.

In a preferred embodiment, the sampling means, the memory means and the control logic comprise memory flip-flops.

Advantageously, the presence or absence of the incident signal is evaluated by detection means receiving two distinct replicas.

These detection means preferably comprise additional comparison means receiving the said two replicas, the output of these additional comparison means being connected to a restartable monostable whose minimun period equals at least the maximum time separating two successive transitions of the incident digital signal.

In a particularly advantageous embodiment, the clock reconstitution stage is arranged in a phase locked loop.

This clock reconstitution stage can then comprise a phase detector stage, having a first input connected to the synchronisation input, a second input connected to the main clock and an output delivering a clock control signal whose mean value is substantially proportional to the time difference between the main clock signal and the digital signal present at the synchronisation input, and whose amplitude is substantially zero in the absence of any transition of the digital signal present at the synchronisation input.

Advantageously the phase detector stage comprises additional delay means connected to the first input and delivering a replica of the digital signal present at the synchronisation input, staggered substantially by one cycle of the main clock; the phase detector stage preferably also comprises a first sampler of the digital signal present at the synchronisation input, a second sampler of the output of the first sampler, the said replica being compared, on the one hand, with the output of the first sampler, and, on the other hand, with the output of the second sampler, the difference of the values of these two comparisons providing the clock control signal.

According to a variant of the invention, allowing the incident digital signal to be processed by using only two replicas of this signal, the auxiliary clock comprises a source of a frequency which is a multiple of the auxiliary clock frequency followed by a divider.

Other advantages and characteristics of the invention will become apparent on examining the detailed description given below and the attached drawings wherein.

Figure 1:
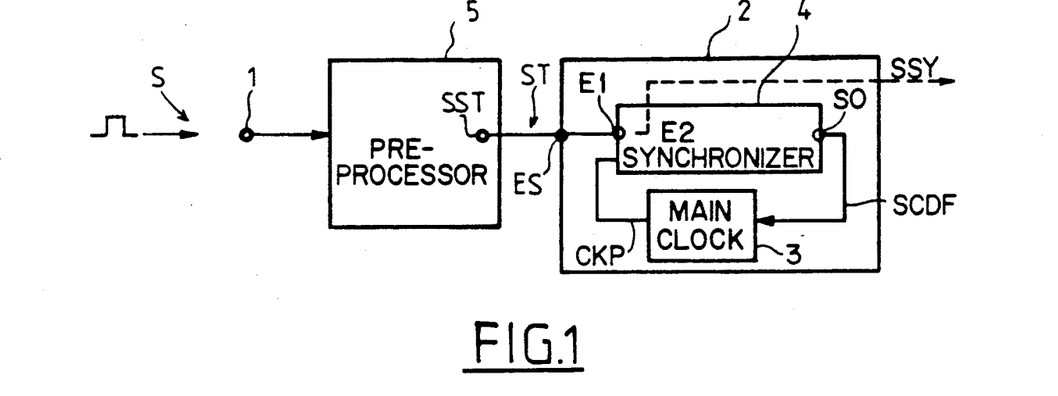
FIG. 1 is a schematic block diagram of the processing device in accordance with the invention.

The processing device represented in FIG. 1 comprises a receiving input 1, receiving an incident digital signal S. This processing device also comprises a clock reconstitution stage 2 comprising a main clock 3 generating a main clock signal CKP and a sychronisation input ES for this main clock 3. This clock reconstitution stage 2 also comprises sychronisation means 4 for this clock having two inputs, the one being connected to the synchronisation input ES and the other receiving the clock signal CKP. As will be explained below, the clock reconstitution stage is arranged to form a phase locked loop and supplies the signal SSY synchronised with the signal CKP.

The processing device comprises moreover preprocessing means 5 for the incident digital signal S. The latter have an output SST connected to the synchronisation input ES and delivering a preprocessed signal ST.

Figure 2:
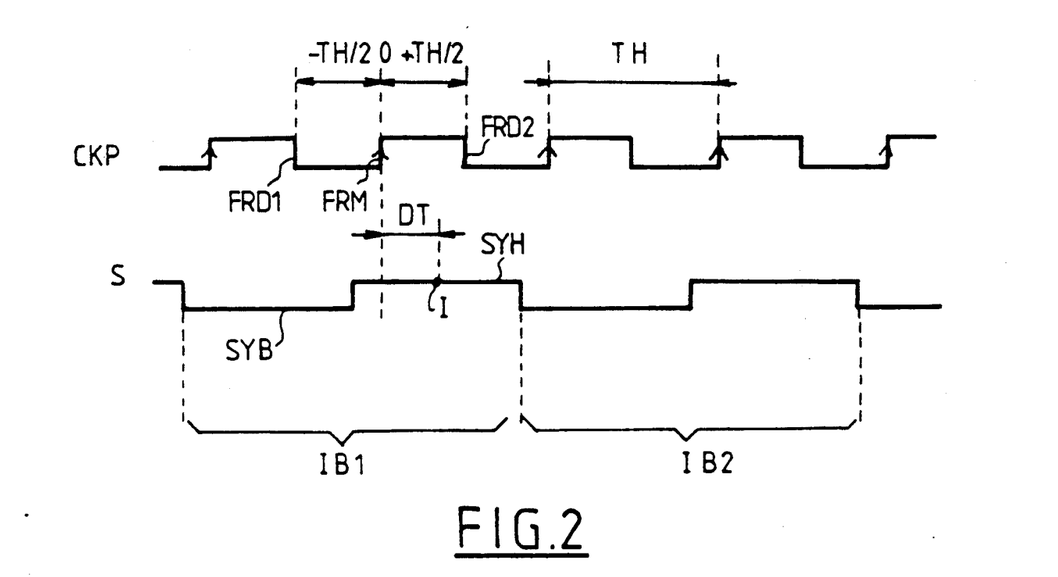
FIG. 2 is a time diagram defining an incident digital signal and its coding in relation to a clock signal.

If reference is made to FIG. 2, it will be seen that the incident digital signal is composed of a succession of high states SYH and low states SYB arriving at the frequency of the transmission clock. In the remaining part of the text, it will be assumed that the digital signal S is coded in a two phase code although the invention applies to any digital signal coded by a succession of high and/or low states. As a matter of principle, the signal S commences with a succession of alternating high and low states, constituting a preamble.

As has been explained above, in the two phase code, the transmission of a binary information is effected by the successive transmission of two states of different values. Thus in order to transmit a binary information IB1 equal to 0 (or respectively equal to 1), there will be successively transmitted a low state SYB (or respectively a high state SYH) and a high state SYH (or respectively a low state SYB). It will also be assumed that the binary data IB1, IB2 represented in FIG. 2 constitute a part of the preamable of signal S serving to synchronise the clock signal CKP. These binary data IB1 and IB2 are identical and equal to zero so as not to suppress any transition in the preamble. The message proper, carried by the signal S and coming after the preamble, also consists of a sequence of binary data such as those represented in FIG. 2.

The main clock signal CKP has a rated frequency linked to that of the signal of the clock transmitting this signal S. In the present case, the frequency of the main clock is equal to 32 megahertz. Its cycle TH is thus equal to 31.25 nanoseconds. The transmission frequency of the high states SYH and/or low states SYB is also equal to 32 megahertz. The transmission rate of the binary data IB transmitted is therefore "16 mega-data per second".

As has been explained above, the time difference between the clock signal CKP and the digital signal S is conditions the time of synchronising this signal CKP in relation to the signal S. This time difference DT is assessed by evaluating the distance between the midpoint I of a high state SYH (or of a low state SYB) and the nearest rising front FRM (pulse) of the clock signal CKP. If this distance is zero, the two signals are in phase. If point I is near the descending front FRD2 (or FRD1) following (or preceding) the rising front FRM, the signal S is delayed (or advanced) with respect to the clock signal CKP and the time difference DT is close to a half cycle TH/2 of the clock signal CKP (or of −TH/2).

Figure 3:
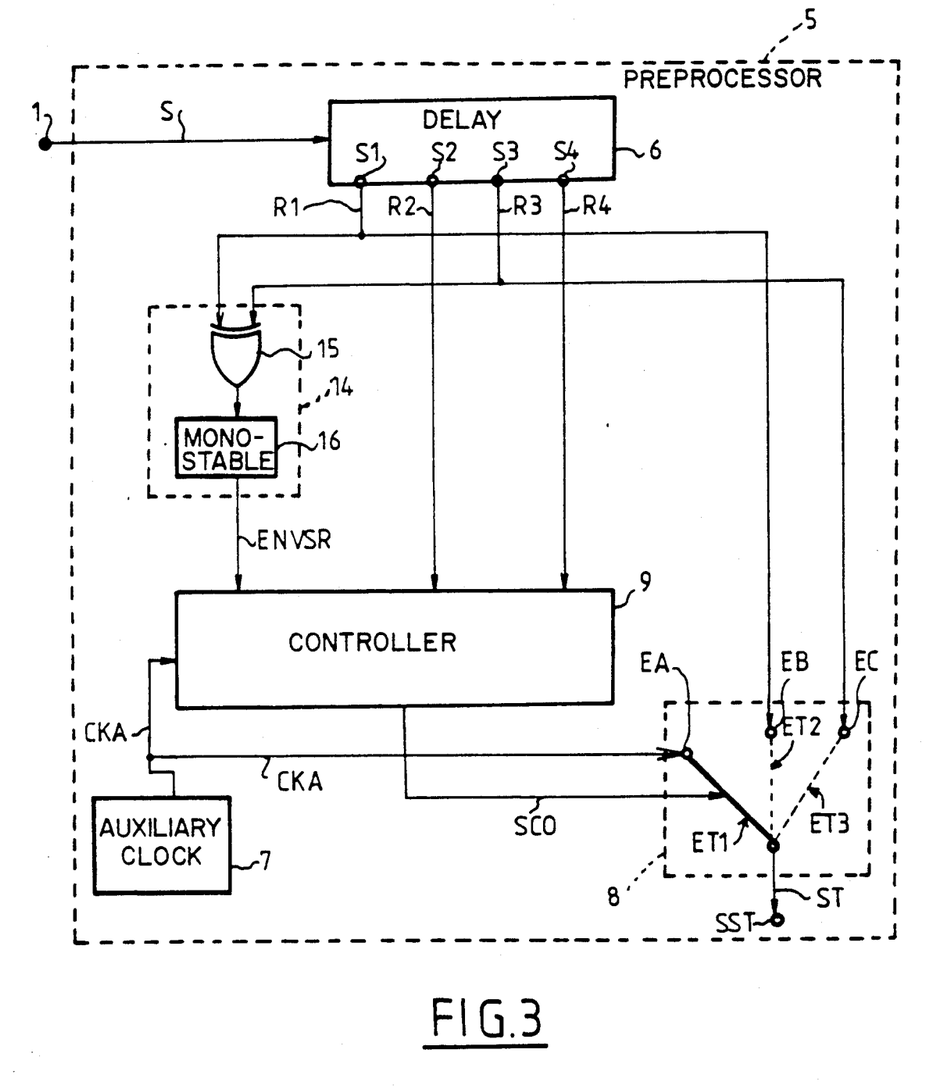
FIG. 3 is a schematic block diagram of the preprocessing means of the processing device of FIG. 1.

If reference is now made more particularly to FIG. 3, it will be seen that the preprocessing means 5 for the incident digital signal S comprises delay means 6 connected to the receiving input 1 of the processing device. These said delay means have four outputs S1, S2, S3, S4 providing respectively four replicas R1, R2, R3, R4 of the incident digital signal S, these replicas differing from each other and being successively staggered in relation to each other by substantially quarter of the cycle of the main clock. Thus this time difference amounts to approximately 7.81 nanoseconds. An uncertainty margin in this time difference is, of course, tolerated and amounts approximately to ±2 nanoseconds.

The first replicas R1 can be the signal S itself or possibly a replica delayed in relation to the signal S either by propagation in the time line from the receiving input 1 or by passing into amplifier elements ("buffers"). The replicas R1 and R3 constituting a first pair of replicas are then staggered in relation to each other by substantially half of the main clock cycle. The same applies to the two replicas R2 and R4 constituting a second pair of replicas.

The delay means 6 can be constituted by an optical fiber or by a conventional capacitor inductance delay circuit or by a coaxial line.

The two replicas R1 and R3 are used for detecting the input signals S. The corresponding outputs S1, S3 are in effect connected to the two inputs of an EXCLUSIVE-OR logic gate 15 followed by a restartable monostable 16. This monostable 16 has a minimum period equal to at least twice the period for transmitting the high or low states, that is to say 62.50 nanoseconds. This period is generally adapted to the line code used in order to cover at least the maximum period separating two successive transitions of the input signal S. The output of this monostable 16 delivers a detection signal ENVSR which thus passes to value 1 on receiving the incident signal S. The (logic gate 15 - monostable 16) unit constitutes the detection means 14.

The preprocessing means 5 also comprise a switch 8 having three inputs EA, EB, EC and one output which corresponds to the output terminal SST of the preprocessing means 5. The three inputs correspond respectively to three states ET1, ET2, ET3. These preprocessing means 5 also comprise an auxiliary clock 7 operating at a frequency which is substantially half of that of the main clock 3. The auxiliary clock 7 thus operates at approximately 16 megahertz with an uncertainty margin of appproximately ±1%.

This auxiliary clock 7 delivers an auxiliary clock signal CKA feeding the first input EA of the switch 8; the second, EB and the third input EC are respectively supplied by the two replicas R1 and R3.

Finally, the preprocessing means 5 comprise control means 9 for this switch 8. These control means 9 receive the signal ENVSR, the other two replicas R2 and R4 as well as the auxiliary clock signal CKA. They deliver a control signal SCO to the switch 8 to put it either into its state ET1 or into its state ET2 or into its state ET3 in order to deliver to the clock reconstitution stage 2 the preprocessed digital signal ST which is, in fact, either the auxiliary clock CKA, or a replica of the incident signal S which is staggered to a greater or lesser extent in respect of time in relation to this signal S.

Figure 4:
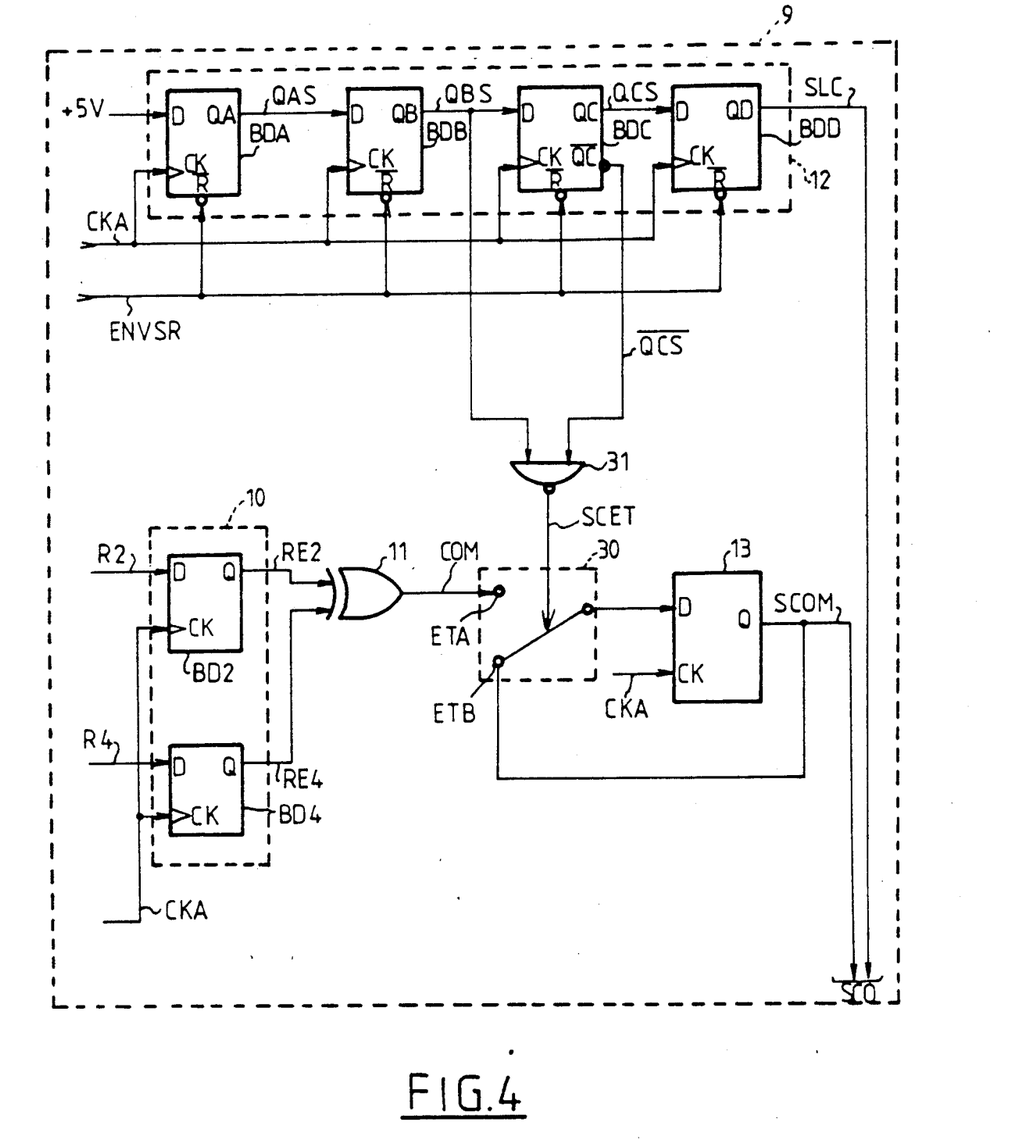
FIG. 4 is a schematic block diagram of the means controlling the preprocessing means of FIG. 3.

If reference is now made more particularly to FIG. 4, it will be seen that the control means 9 comprise sampling means 10 constituted by two D flip-flops BD2 and BD4 respectively receiving the two replicas R2 and R4 on their inputs D.

These two flip-flops BD2 and BD4 receive the auxiliary clock signal CKA on their input CK. The outputs Q of these two flip-flops BD2 and BD4 deliver respectively two sampled replicas RE2 and RE4 which are compared in an EXCLUSIVE OR logic gate 11. The comparison signal COM passed from this logic gate 11 is allocated to the state ETA of a switch 30 with two states ETA, ETB whose output is connected to the input D of another D flip-flop 13. As will be seen below, this flip-flop 13 constitutes a means for memorising the value of the signal COM. The input CK of this flip-flop 13 also receives the auxiliary clock signal CKA, the output Q of this flip-flop 13 delivering a comparison signal SCOM which is one of the components of the control signal SCO. The second state ETB of the switch 30 is directly connected to the output Q of the flip-flop 13. This state ETB is, in fact, a state of rest whilst the state ETA is an operating state.

The control means 9 also comprises a control logic 12 which is constituted by a delay register constituted by four D flip-flops respectively designated BDA, BDB, BDC, BDD. The input CK of each of these flip-flops BDA to BDD receives the auxiliary clock signal CKA and the zero setting input $\overline{R}$ of each of these flip-flops BDA to BDD receives the detection signal ENVSR. The input D of the first flip-flop BDA is energised with 5 volts d.c. The output QD of this flip-flop delivers a signal QAS to the input D of the flip-flop BDB, the same applies as regards the output QB of the flip-flop BDB which delivers a signal QBS to the input D of the flip-flop BDC and as regards the flip-flop BDC delivering a signal QCS to the input D of the flip-flop BDD. The output QD of the flip-flop BDD delivers a logic control signal SLC which constitutes the second part of the control signal SCO. The signals QBS and $\overline{QCS}$ of the flip-flops BDB and BDC are linked to the two inputs of a logic NAND gate 31 delivering at its output a signal SCET switching the two states switch 30 to one of its two states ETA, ETB.

Figure 5:
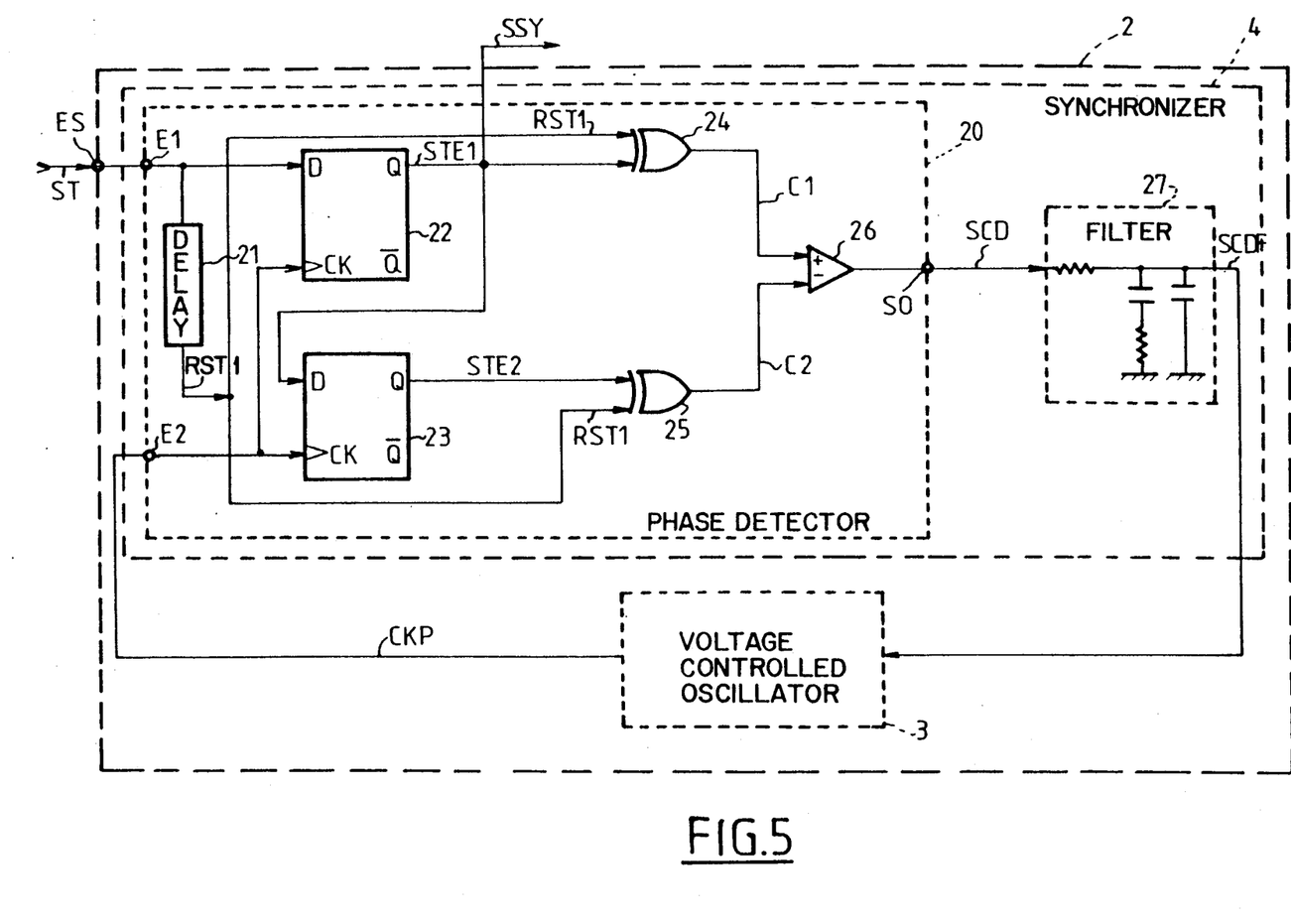
FIG. 5 is a schematic block diagram of the clock reconstitution stage of the processing device of FIG. 1.

If reference is now made to FIG. 5, it will be seen that the synchronisation means 4 of the clock reconstitution stage 2, comprise a first stage 20 having two inputs E1 and E2 and an output SO connected to a filter stage 27 whose output is connected to a voltage controlled oscillator 3 delivering the main clock signal CKP to the input terminal E2 of the first stage 20. It would be wrong to designate the voltage controlled oscillator and the main clock by the same reference. Only the term main clock will be used below.

The input E1 of this first stage 20, connected to the synchronisation input ES, which stage is in fact a phase detector stage, receives the preprocessed signal ST. This stage comprises additional delay means 21 connected to the input E1 and providing a replica RST1 of the preprocessed digital signal ST, which replica is staggered in time with a delay substantially equal to one cycle of the main clock 3, that is to say 31.25 nanoseconds (the tolerance margin of this delay is of the order of ±5 nanoseconds). The preprocessed digital signal ST is connected to the input D of a first D flip-flop 22 constituting a first sampler. The output Q of this flip-flop 22 delivers a sampled signal STE1 to the input D of a second D flip-flop 23 constituting a second sampler. The output Q of this second sampler 23 delivers a sampled signal STE2. The inputs CK of each of the two flip-flops 22 and 23 receive the main clock signal CKP. The samples signal STE1 is compared with the staggered replica RST1 of the signal ST in an EXCLUSIVE OR logic gate 24 and the sampled signal STE2 is compared with the staggered replica RST1 in a second EXCLUSIVE OR logic gate 25. These two gates 24 and 25 respectively deliver two comparison signals C1 and C2 connected respectively to a differential amplifier 26 whose output is connected to the output SO of the first stage 20 and which delivers a control signal for the main clock SCD. The expert will observe that the successive states of the incident signal after synchronisation, (signal SSY) are provided by the sampled signal STE1.

The filter stage 27 is conventionally constituted by a capacitative resistor network and the filtered control signal SCDF effectively controls the main clock 3.

In order to describe the operation of this processing device, reference will now be made more particularly to FIG. 6 which shows time diagrams allowing the operation of the preprocessing means 5 to be understood. The principle of this operation is based on the use of the auxiliary clock signal CKA to sample the incident signal S. As has been explained above, the time difference between the main clock signal CKP and the digital signal S is evaluated by examining the distance existing between a mid-point I of one state of the signal S and a rising front of the clock signal CKP. However, since the auxiliary clock 7 is synchronous with the main clock 3, the time difference between the two signals of the main and auxiliary clocks is known. Thus by using the auxiliary clock signal for sampling the digital signal S, it will be possible to evaluate the time difference existing between the main clock signal CKP and the digital signal S. This is why all the components of the preprocessing means 5 are placed in step with the progression rate of the rising fronts of the auxiliary clock 7.

It is advantageous for this auxiliary clock 7 to be in phase with the main clock 3, that is to say, that the rising front of the main clock signal CKP coincides with the mid-point I situated between a rising front and a descending front of the auxiliary clock signal CKA. In point of fact, in the absence of a digital signal S, or before any switching decision, the switch 8 is placed into its state ET1. The input EA of this switch is therefore connected to the output SST of the control means and therefore to the synchronisation input ES. Thus in this state ET1, the auxiliary clock signal CKA performs the function of a digital input signal and the time difference between the main clock signal CKP and the auxiliary clock signal CKA is zero. The phase locked loop is therefore in a state of a stable equilibrium. Another advantage of subjecting the main clock to the control of the auxiliary clock is to prevent a frequency deviation of the main clock 3.

Figure 6:
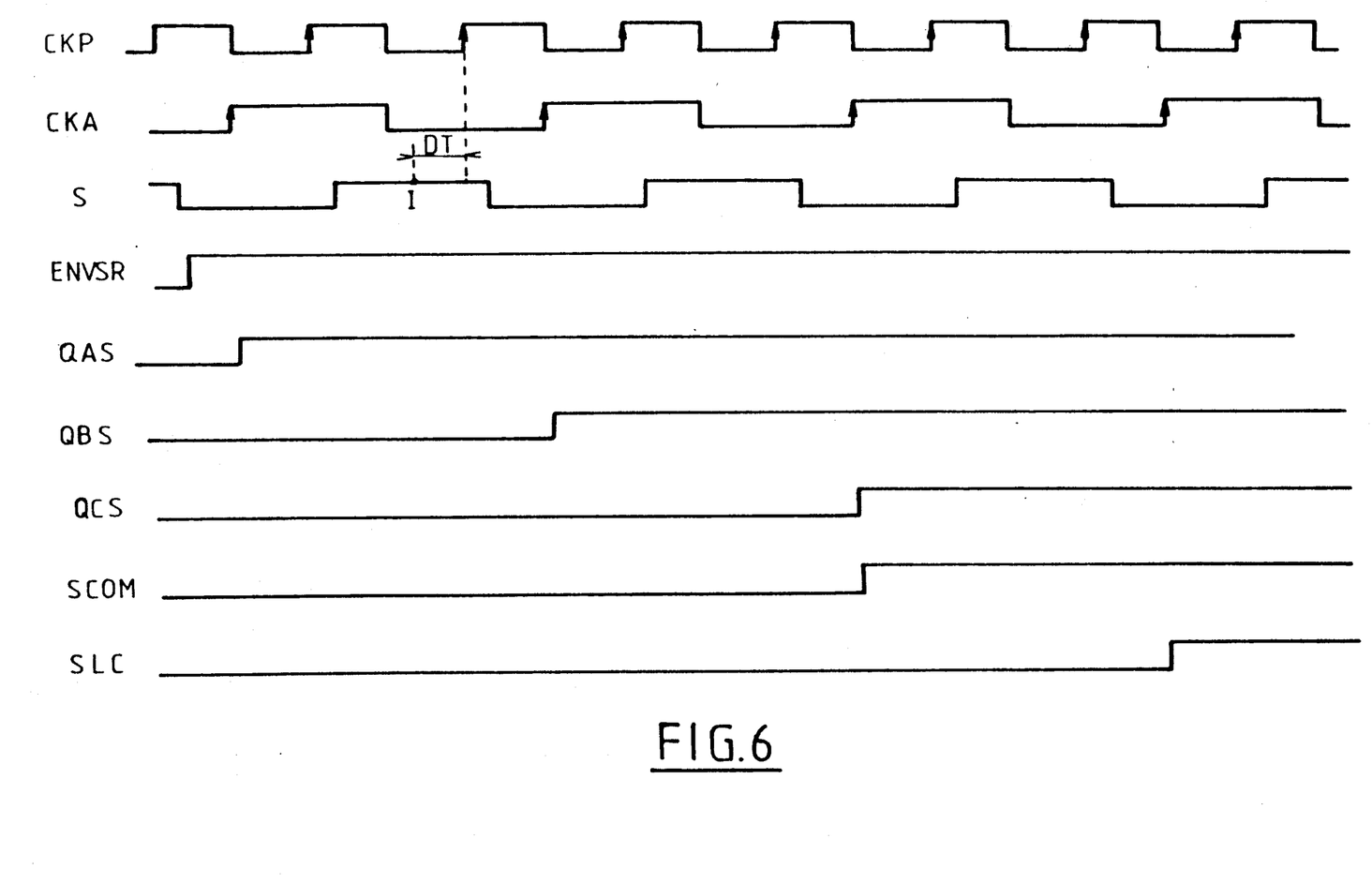
FIG. 6 represents timing diagrams illustrating one case of the operation of the processing device of FIG. 1, FIGS. 7A and 7F are timing diagrams illustrating different operating cases of the control means of FIG. 4, and FIGS. 8A to 8C are timing diagrams illustrating different operating cases of the clock reconstitution stage of FIG. 5.

In the case of FIG. 6, the time difference DT between the signal CKP and signal S is negative and is clos to a half cycle of the clock signal CKP. When the digital signal S arrives at the input of the delay means 6, the two replicas R1 and R3 of this signal will set the rise of the signal ENVSR to 1. The four flip-flops BDA to BDD which were forced to zero when the signal ENVSR was equal to zero, are no longer in this position when the signal ENVSR has the value of 1. At the first rising front of the clock signal CKA which follows the rise of the signal ENVSR, the signal QAS of the flip-flop BDA assumes the value of 1. The switch 30 is then in its rest state ETB. At the following rising front of the clock signal CKA, the signal QBS emerging from the flip-flop BDB passes to 1. Since the signal $\overline{QCS}$ is equal to 1, the signal SCET coming from the NAND logic gate 31 will therefore be equal to zero and causes the switch 30 to pass into its operating state ETA connecting the comparison signal COM to the input D of the flip-flop 13. At the following rising front, the signal QCS coming from the flip-flops BDC passes to 1. The value of the comparison signal COM is memorised in the flip-flop 13 and is available at the output of this flip-flop by means of the signal SCOM. The signal QCS passes to zero and the switch 30 returns to its rest state ETB under the action of the signal SCET having returned to 1. At the rising front of the following clock signal, the signal SLC coming from the output QD of the flip-flop BDD passes to 1 and under the combined action of the signal SLC and the value of the signal SCOM. determining the value of the control signal SCO, the switch 8 passes either into its state ET2 or into its state ET3. Thereupon the switch will finally remain in this chosen state.

The choice between these two states ET2 and ET3 depends on the sampling of the replicas R2 and R4 of the incident signal S in the flip-flops BD2 and BD4 and on the result of this comparison COM with the output of the logic gate 11. To render the conditions of this choice more readily understood, reference will now be made to the timing diagram of FIGS. 7A to 7D.

Figure 7A:
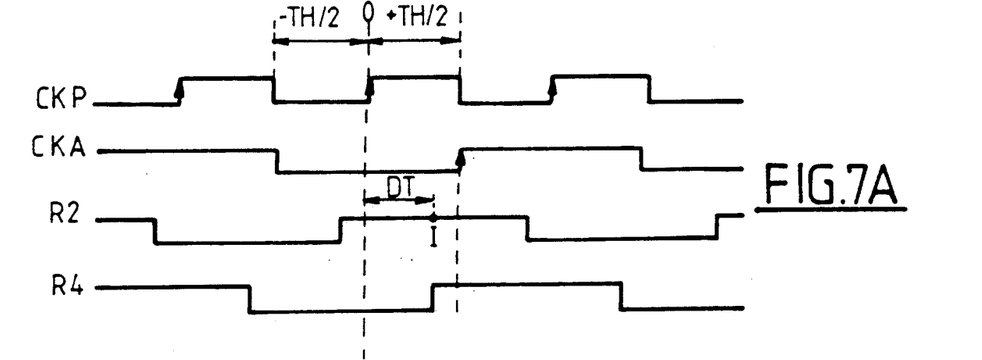

In FIG. 7A, there has been represented a replica R2 of the signal S which is delayed in relation to the main clock signal CKP. The time difference between this clock signal CKP and the replica R2 is positive and close to one half-cycle TH/2 of the clock signal CKP. The replica R4 is delayed by one half-cycle of the main clock in relation to the replica R2. In this configuration, it is, of course, not feasible to inject the signal S as it is into the clock reconstitution stage 2. The replica R1 of this digital signal will therefore be injected which is ahead by one quarter cycle in relation to the replica R2 so as to bring back this time difference DT into a range comprised between −TH/4 and +TH/4, and this in order to prevent the "hang up" phenomenon. This configuration is determined by the sampling of the replicas R2 and R4 by the two flip-flops BD2 and BD4 at the rising front of the auxiliary clock [signal] CKA. Thus in this case, the values of the sampled replica RE2 and of the sampled replica RE4 are equal to 1 and the output of the COM signal is therefore equal to 0.

Figure 7B:
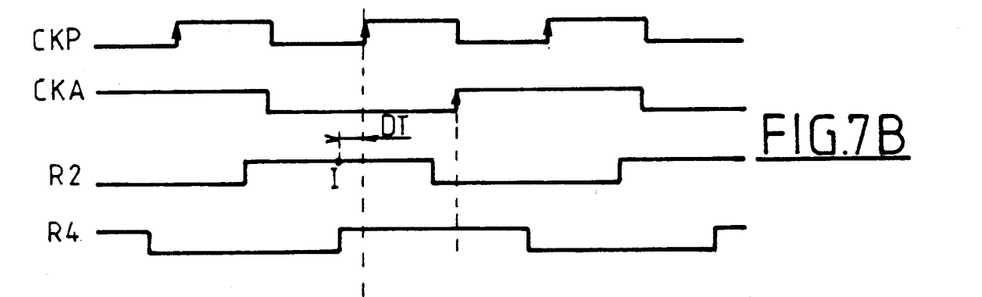

In the diagram of FIG. 7B, the time difference DT is negative and close to zero. As will be explained below, since one cannot determine whether this difference is close to zero or close to −TH/2, a replica of the digital signal will be injected into the clock reconstitution stage 2, which signal is delayed by one quarter cycle of the main clock in relation to this replica R2 so as to bring the time difference DT into a range comprised between −TH/4 and +TH/4. In this configuration, the sampling by means of the rising front of the clock signal CKA leads to a comparison of the values 0 and 1 and the output of the COM signal is equal to 1. The replica R3 is therefore injected into the clock reconstitution stage 2.

Figure 7C:
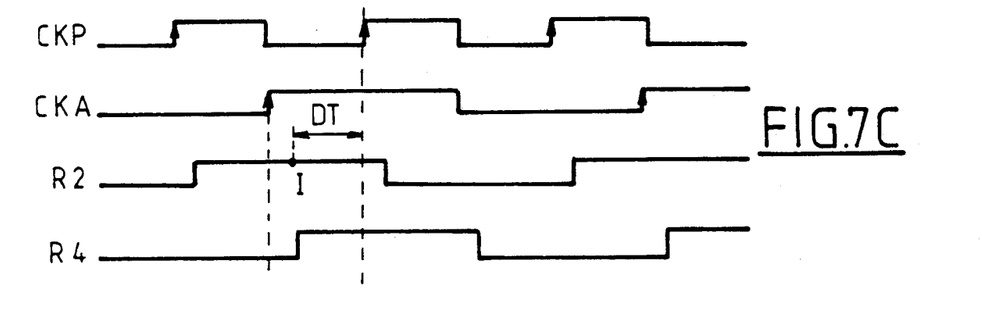

In this case represented in FIG. 7C where the time difference DT is negative but close to one half-cycle of the main clock, the value of the comparison signal will also give value 1 and the replica R3 will be injected so as to bring back the time difference DT into a range of −TH/4 to +TH/4.

Figure 7D:
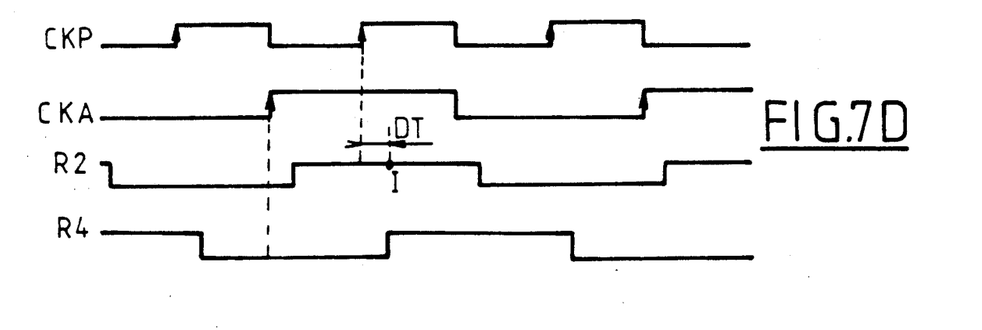

Finally, in the case represented in FIG. 7D where the time difference is positive and close to 0, the value of the comparison signal will be equal to 0 and it is the replica R1 of the signal which will be injected at the synchronisation input ES by means of the state ET2 of the switch 8, that is to say, the replica which is ahead of the main clock by one quarter cycle in relation to the replica R2.

Figure 7E:
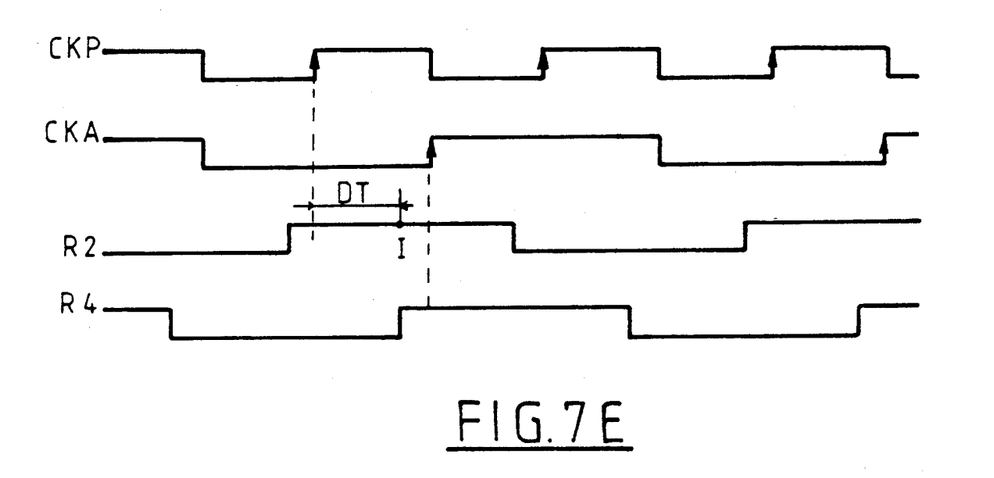

As the expert will have understood, in certain cases, an ambiguity may occur in the determination of the time difference DT. This is illustrated by the timing diagrams of FIGS. 7E and 7F. In the case of FIG. 7E, the time difference DT is positive and close to one half-cycle of the main clock. In this case, the sampling at the rising front of the clock signal CKA will lead to the comparison of values 1 and 1 in the logic gate 11 and the value of the signal SCOM will have the value 0.

Figure 7F:
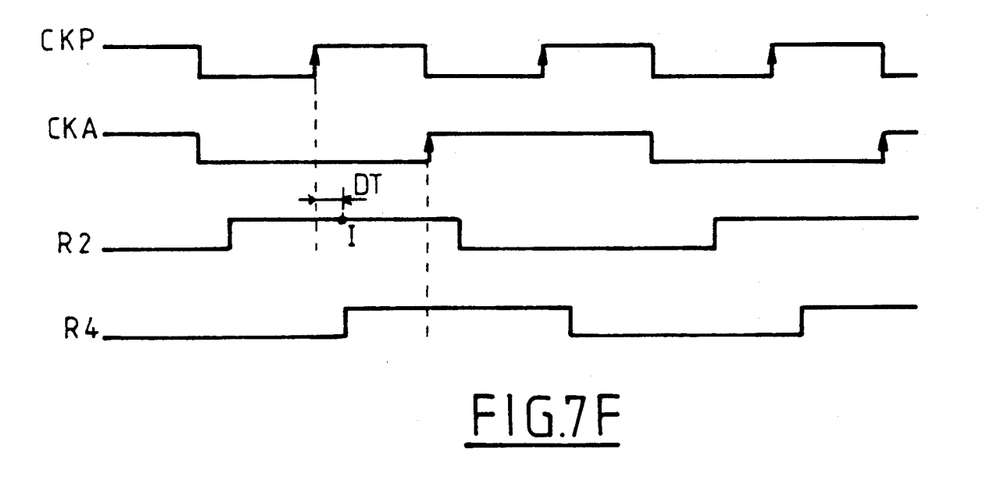

In the case of FIG. 7F, the time difference DT is positive and close to 0. But in this case too, the sampling at the rising front of the clock signal CKA will lead to a comparison of two values 1 and 1 in the logic gate 11 and the signal SCOM will have the value of 0. Of course in theory, in the case of FIG. 7F, one could inject the incident digital signal into the clock reconstitution stage 2 as it is, because the synchronisation time is short since the time difference DT is small. On the other hand, if this operation were to be effected without precaution in the case of FIG. 7E, a "hang up" phenomenon would be encountered. To overcome this indeterminacy, a replica will therefore be chosen such that in all cases, the time difference DT between the main clock signal and the incident digital signal should be from −TH/4 to +TH/4, which leads to injecting the replica R1. Thus in this embodiment, it is absolutely necessary for the delay means to provide four replicas of the incident signal.

With these preprocessing means 5, a device has been duly obtained permitting a fast synchronisation of the main clock in relation to the incident digital signal and this irrespective of the time difference between the main clock signal and the digital signal, in particular at a high transmission rate.

Figure 8A:
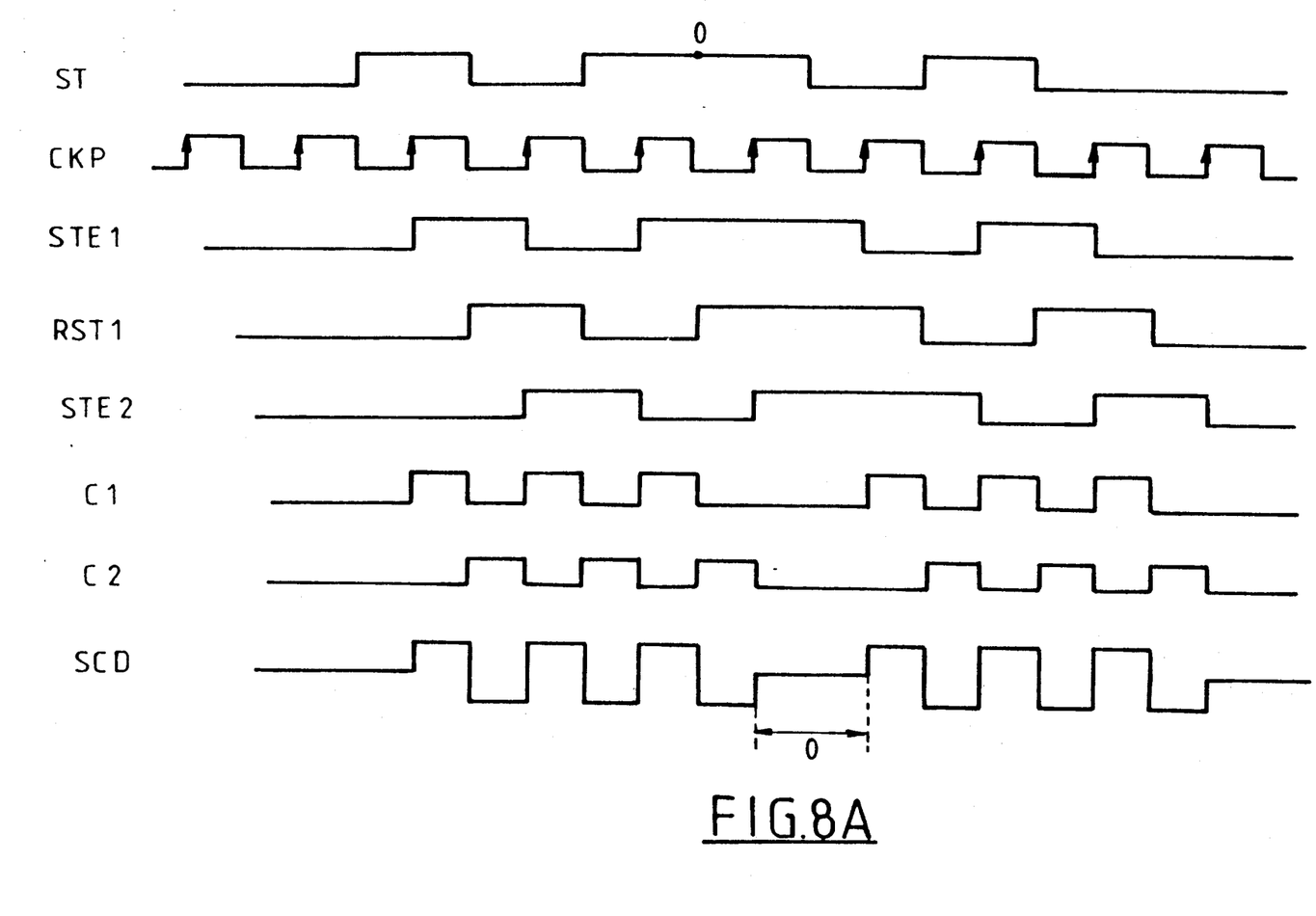

The operation of the phase locked loop 2 will now be illustrated with reference to FIGS. 8A to 8C. In FIG. 8A, there has been represented a timing diagram of the preprocessed digital signal ST arriving at the input ES and hence at the input E1 of the phase locked loop. This signal is in phase with the main clock signal CKP. In other words, the time difference DT is zero. After sampling in the flip-flop 22, the sampled output STE1 is obtained; after passing into the additional delay means 21, the delayed replica of the digital signal RST1 is obtained and the sampling of the output STE1 gives the signal STE2. After comparison in the logic gates 24 and 25, there are obtained the comparison signals C1 and C2 and finally, the difference (C1 − C2) represented by the clock control signal SCD.

It will thus be observed on the one hand that the mean value of signal SCD is zero which does not produce any effect on the main clock 3, the latter remaining in phase with the signal ST. On the other hand, it will be observed that in the digital signal ST, there is no transition at the level of point O. This absence of transition is found again in signal SCD at the level of the interval marked O and over which the signal SCD is zero. Thus no action is taken on the main clock which prevents the phase locked loop from being destabilised.

Figure 8B:
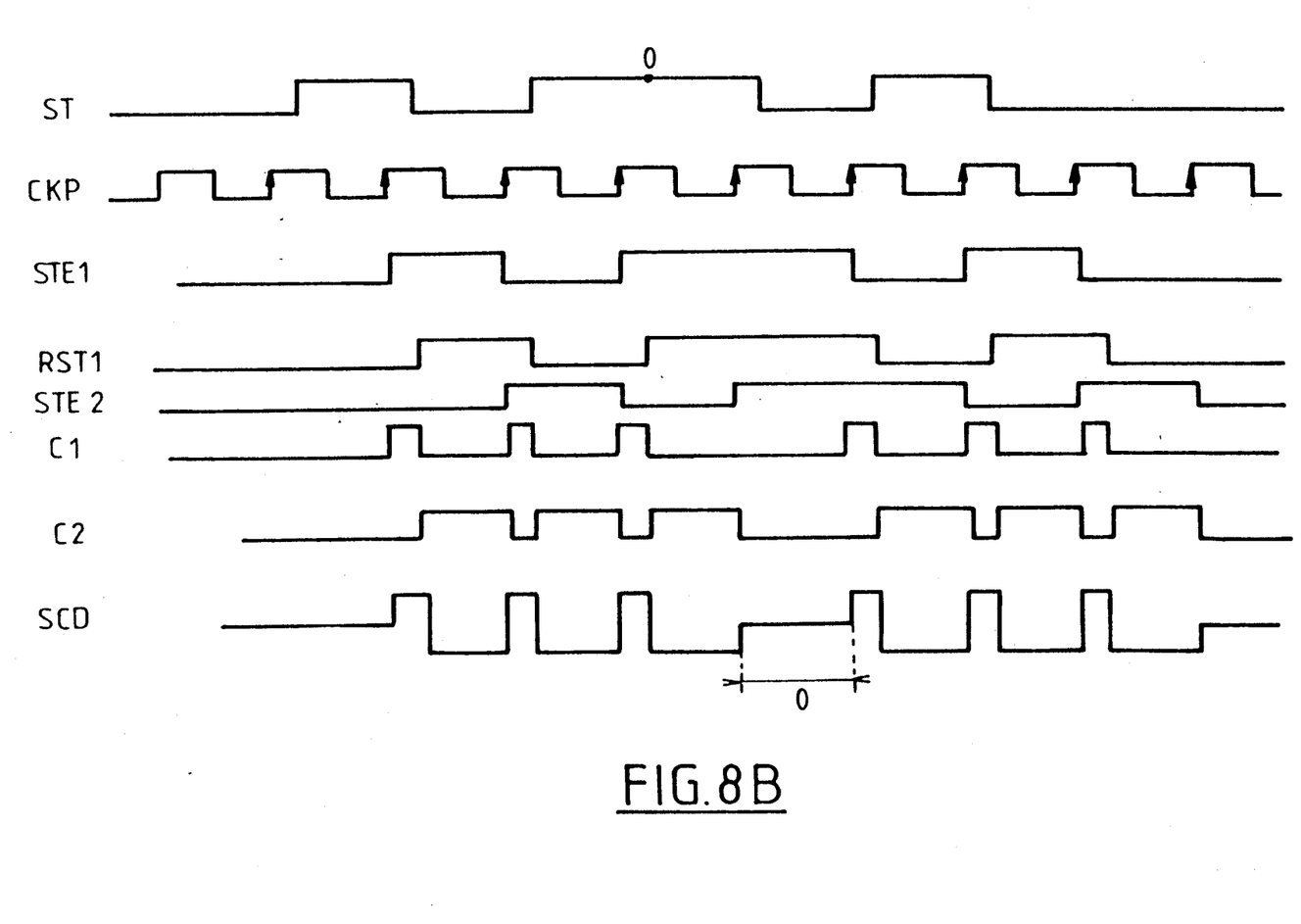
Figure 8C:
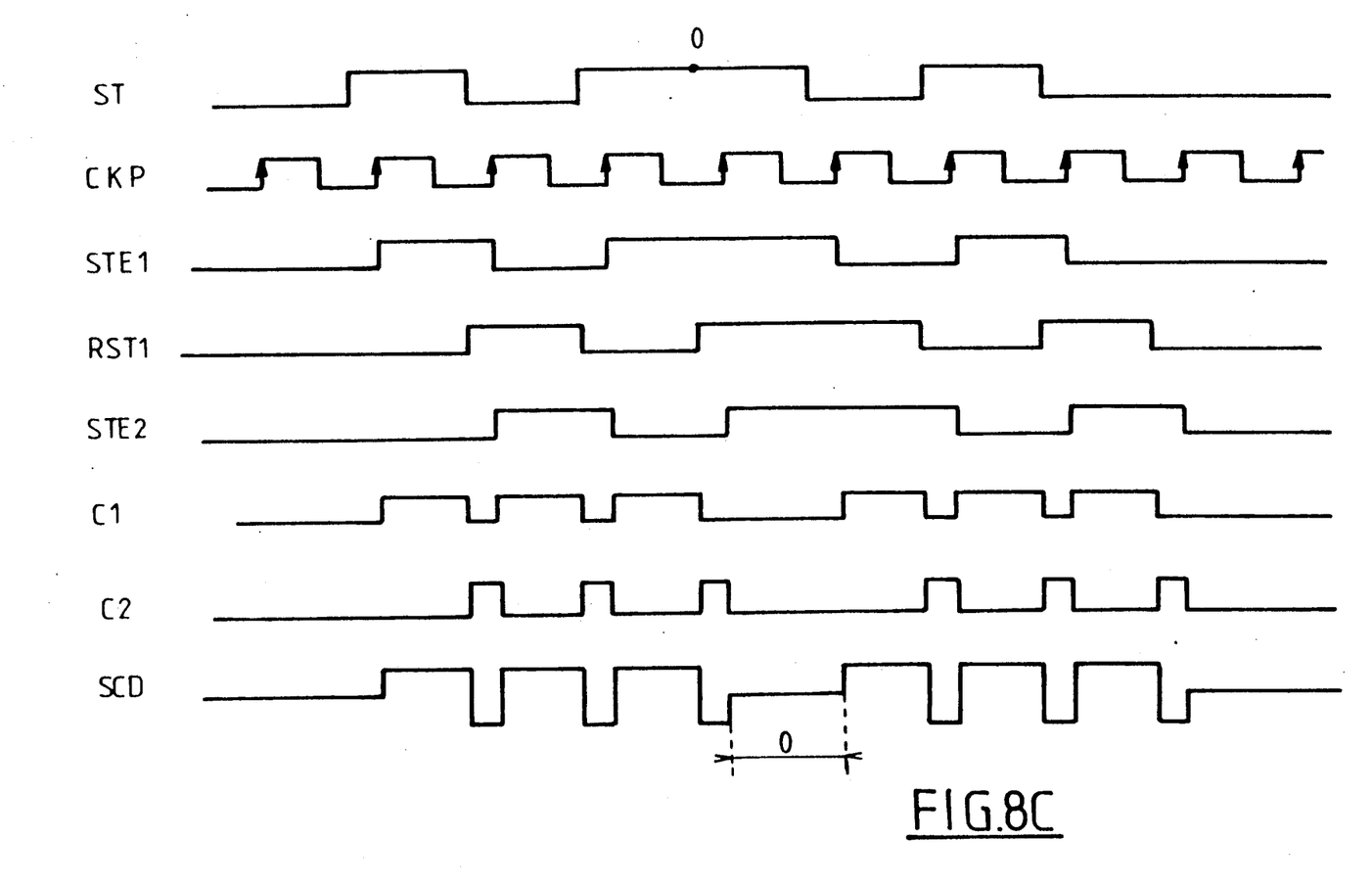

In FIG. 8B, a signal St has been represented which is ahead in relation to the clock signal CKP (DT is negative). These signals STE1, RST1, C1, C2 and SCD are re-encountered in a similar way. It will then be observed that the mean value of signal SCD is negative and the mean value will be all the greater in absolute terms, the greater the time difference DT between the clock signal CKP and the digital signal ST present at the synchronisation input. It will also be observed that since there is no transition at point O, the value of signal SCD in the interval marked O is zero.

In FIG. 8B, a signal ST has been represented which is delayed in relation to the clock signal CKP (DT is positive). All the signals of FIGS. 8A and 8B will be similarly re-encountered and it will then be observed that the mean value of signal SCD is positive which will contribute to reducing this time difference. The absence of transition at point O will always be reflected by a zero SCD signal over the interval marked O. In a similar way, the mean value of signal SCd is the greater, as the time difference DT is greater in absolute terms.

The expert will therefore understand that a device has here been duly obtained, making it possible on the one hand to correct the time difference between the clock signal CKP in relation to the incident digital signal S, and also on the other hand, to prevent disturbance of the phase locked loop during an absence of transition in the digital signal at the input of this phase locked loop.

The invention may allow variants, in particular the following:

- in the preferred embodiment described above, the choice of replicas to be sampled may of course vary. The only condition is that two replicas should be taken staggered in time in relation to each other by one half-cycle of the main clock. Similarly, the choice of two replicas permitting the absence or presence of an incident digital signal to be detected is arbitrary.
- It has been seen above that four outputs of the delay means 6 were necessary to remedy the ambiguity in determining the time difference between the main clock signal and the incident digital signal. This was necessary because the auxiliary clock 7 operated at a frequency which was substantially half that of the main clock 3. However, one could consider obtaining preprocessing means with delay means comprising only two outputs providing two replicas staggered in time in relation to each other by one half-cycle of the main clock, but then using in that case an auxiliary clock operating at a frequency substantially double that of the main clock.

In effect, the resolution of the time difference obtained with the delay means having four outputs is now reduced by half. It is therefore necessary to compensate for this loss of "spatial" resolution by an increase in the "temporal" resolution which is obtained by multiplying the frequency of the auxiliary clock by four. This new arrangement would not only necessitate the sampling of two replicas of the incident signal, but also the sampling of the main clock signal by means of the auxiliary clock signal in order to overcome the ambiguity in the phase detection. In that case, it may be envisaged (since, in the absence of the signal or in the absence of a switching decision, the auxiliary clock signal must control the main clock 3), that the auxiliary clock 7 should comprise a frequency source twice that of the main clock followed by a divider.

Of course, this arrangement could be given a general form by using a frequency source which is a multiple of that of the auxiliary clock, followed by a divider. This arrangement of the auxiliary clock could, moreover, be applied even in the case of delay means using four outputs.

I claim:

1. A device for processing an incident digital signal carrying in a baseband messages coded by a succession of high and/or low states occurring at a transmission clock frequency, comprising:
   a) a clock reconstitution stage including a main adjustable clock for providing a main adjustable clock signal having a rated frequency which is K times the frequency of the transmission clock, where K is an integer at least equal to one, and including synchronisation means for synchronisation of the main adjustable clock in response to a synchronization signal;
   b) delay means responsive to the incident digital signal for providing first and second replicas of the incident signal whereby the second replica is delayed in time from the first replica by a fraction of one cycle of the main adjustable clock signal rated frequency;
   c) an auxiliary clock for providing an auxiliary clock signal operating at a frequency harmonically related to the rated frequency of the main adjustable clock signal;
   d) detection means for determining the presence or absence of the incident digital signal; and
   e) control means responsive to the detection means and the delay means for:
      e1) providing, in the absence of the incident digital signal, the auxiliary clock signal as the synchronization signal to the synchronisation means so that the main adjustable clock signal is synchronized to the auxiliary clock signal; and
      e2) providing, in the presence of the incident digital signal, the first replica or the second replica of the incident signal as the synchronization signal to the synchronisation means, depending on the timing relationship between the auxiliary clock signal and the incident digital signal.

2. The device according to claim 1 in which the second replica of the incident signal is delayed in time from the first replica of the incident signal by one half cycle of the main clock signal.

3. The device according to claim 1 in which the control means provides, in the presence of the incident digital signal, the first replica or the second replica of the incident signal as the synchronisation signal to the synchronisation input means, depending on the timing relationship of the auxiliary clock signal with respect to the first and second replicas of the incident digital signal.

4. The device according to claim 3 in which the auxiliary clock signal operates at a frequency which is substantially twice the rated frequency of the main adjustable clock signal.

5. The device according to claim 1 in which the delay means further provides third and fourth replicas of the incident signal whereby the fourth replica is delayed in time from the third replica by the fraction of one cycle of the main adjustable clock signal rated frequency, and the third replica is delayed in time from the first replica by substantially one half of the fraction of one cycle of the main adjustable clock signal rated frequency; and in which the control means provides, in the presence of the incident digital signal, the first replica or the second replica of the incident signal as the synchronisation signal to the synchronisation input means, depending on the timing relationship of the auxiliary clock signal with respect to the third and fourth replicas of the incident digital signal.

6. The device according to claim 5 in which the auxiliary clock signal operates at a frequency which is substantially one half of the rated frequency of the main adjustable clock signal.

7. The device according to claim 3 in which the control means includes sampling means for simultaneous sampling, at the frequency of the auxiliary clock signal, the first and second replicas; and comparing means for comparing the value of said sampled first replica with the value of said sampled second replica and for providing a comparison signal having a value which depends on the values of the sampled first and second replicas.

8. The device according to claim 5 in which the control means includes sampling means for simultaneous sampling, at the frequency of the auxiliary clock signal, the third and fourth replicas; and comparing means for comparing the value of said sampled third replica with the value of said sampled fourth replica and for providing a comparison signal having a value which depends on the values of the sampled third and fourth replicas.

9. The device according to claim 7 in which the control means further includes memory means for storing the value of the comparison signal, where the stored value of the comparison signal is used to determine the timing relationship of the auxiliary clock signal with respect to the third and fourth replicas of the incident digital signal.

10. The device according to claim 8 in which the control means further includes memory means for storing the value of the comparison signal, where the stored value of the comparison signal is used to determine the timing relationship of the auxiliary clock signal with respect to the second and third replicas of the incident digital signal.

11. The device according to claim 10 in which said memory means includes a memory flip-flop.

12. The device according to claim 1 in which the detection means for determining the presence or absence of the incident digital signal is responsive to the first and second replicas of the incident digital signal provided by the delay means.

13. The device according to claim 5 in which the detection means for determining the presence or absence of the incident digital signal is responsive to two distinct replicas of the incident digital signal provided by the delayed means, said two distinct replicas being chosen from the group consisting of the first, second, third and fourth replicas.

14. The device according to claim 12 in which the detection means includes additional comparison means for comparing the value of the first replica with the value of the second replica and for providing a comparison signal having a value which depends on the values of the first and second replicas, and a restartable monostable responsive to the comparison signal and having a minimum output pulse period which is at least the maximum interval of time separating two successive state transitions of the incident digital signal.

15. The device according to claim 13 in which the detection means includes additional comparison means for comparing to each other the values of the two distinct replicas of the incident digital signal and for providing a comparison signal having a value which depends on the values of the two distinct replicas, and a restartable monostable responsive to the comparison signal and having a minimum output pulse period which is at least the maximum interval of time separating two sucessive state transitions of the incident digital signal.

16. The device according to claim 1 in which the clock reconstitution stage includes a phase locked loop.

17. The device according to claim 5 in which the clock reconstitution stage includes a phase locked loop.

18. The device according to claim 17 in which the clock reconstitution stage includes phase detector means responsive to the synchronisation signal and to the main adjustable clock signal, for providing a clock control signal whose mean value is substantially proportional to the time difference between the main adjustable clock signal and the synchronisation signal, and whose value is substantially zero in the absence of any transitions in the synchronisation signal.

19. The device according to claim 18 in which the phase detector means includes additional delay means responsive to the synchronisation signal and providing a replica of the synchronisation signal which is delayed by substantially one cycle of the main adjustable clock signal.

20. The device according to claim 1 in which the auxiliary clock includes
 (i) a frequency source which is a multiple of the frequency of the auxiliary clock signal, and
 (ii) a frequency divider responsive to the frequency source for providing the auxiliary clock signal which enables the incident digital signal to be processed using only the first and second replicas thereof.

21. The device according to claim 1 in which the incident digital signal commences with a succession of alternating high and low states.

* * * * *

UNITED STATES PATENT AND TRADEMARK OFFICE
CERTIFICATE OF CORRECTION

PATENT NO. : 5,050,193

DATED : September 17, 1991

INVENTOR(S) : Benoit Ponsard

Page 1 of 2

It is certified that error appears in the above-identified patent and that said Letters Patent is hereby corrected as shown below:

Abstract, line 2, change "deliver" to -- delivers --.

Column 1, line 25, change "follow" to -- follows --.
Column 1, line 28, change "sucession" to -- succession --.
Column 2, line 25, change "notto" to -- not to --.
Column 4, line 64, change "incidient" to -- incident --.
Column 5, line 49, after "signal S" delete "is".
Column 6, line 2, after "substantially" insert -- a --.
Column 8, line 48, change "clos" to -- close --.
Column 9, line 9, after "SCOM" delete the period.
Column 9, line 66, before "replica" change "the" to
          -- that --.
Column 10, line 60, change "St" to -- ST --.
Column 11, line 3, change "8B" to -- 8C --.

UNITED STATES PATENT AND TRADEMARK OFFICE
CERTIFICATE OF CORRECTION

PATENT NO. : 5,050,193

DATED : September 17, 1991

INVENTOR(S) : Benoit Ponsard

It is certified that error appears in the above-identified patent and that said Letters Patent is hereby corrected as shown below:

Column 11, line 11, change "Scd" to —SCD—.

Signed and Sealed this

Twenty-ninth Day of June, 1993

Attest:

MICHAEL K. KIRK

*Attesting Officer*      *Acting Commissioner of Patents and Trademarks*